US010267493B2

(12) United States Patent
Wang (10) Patent No.: US 10,267,493 B2
(45) Date of Patent: Apr. 23, 2019

(54) OPTICAL DEVICE FOR ADJUSTING LIGHT EMITTED FROM A MULTIMEDIA MOBILE COMMUNICATION DEVICE

(71) Applicant: Cheng-Kuo Wang, New Taipei (TW)

(72) Inventor: Cheng-Kuo Wang, New Taipei (TW)

( * ) Notice: Subject to any disclaimer, the term of this patent is extended or adjusted under 35 U.S.C. 154(b) by 532 days.

(21) Appl. No.: 15/066,493

(22) Filed: Mar. 10, 2016

(65) Prior Publication Data

US 2017/0261182 A1 Sep. 14, 2017

(51) Int. Cl.
| | |
|---|---|
| *F21V 5/00* | (2018.01) |
| *F21V 5/04* | (2006.01) |
| *F21V 14/06* | (2006.01) |
| *F21V 17/02* | (2006.01) |
| *F21V 17/08* | (2006.01) |
| *F21V 17/16* | (2006.01) |

(52) U.S. Cl.
CPC ............ *F21V 14/065* (2013.01); *F21V 5/006* (2013.01); *F21V 5/048* (2013.01); *F21V 17/02* (2013.01); *F21V 17/08* (2013.01); *F21V 17/164* (2013.01)

(58) Field of Classification Search
CPC ...... F21V 14/065; F21V 17/164; F21V 17/08; F21V 17/02; F21V 5/048; F21V 5/006; F21V 13/045; G02B 7/022; G02B 7/023; G02B 7/02; G02B 7/14; G02B 7/002; H04M 1/0272; H04M 1/0202; H04M 1/026; H04M 1/0252; H04M 1/0254; F21L 4/027; F21L 4/022; F21L 4/005; G03B 17/566
See application file for complete search history.

(56) References Cited

U.S. PATENT DOCUMENTS

| | | | |
|---|---|---|---|
| 6,435,690 B1* | 8/2002 | Till ..................... | H04M 1/0202 362/577 |
| 8,687,299 B1* | 4/2014 | Sanford .................. | F16B 21/04 359/827 |
| 2010/0118544 A1* | 5/2010 | Lao ........................ | G03B 29/00 362/296.01 |
| 2012/0019920 A1* | 1/2012 | Mongan ............... | G02B 6/0035 359/601 |
| 2012/0245422 A1* | 9/2012 | Hasbun .............. | A61B 1/00108 600/200 |
| 2013/0107109 A1* | 5/2013 | Yang ..................... | G06F 1/1632 348/373 |

(Continued)

*Primary Examiner* — Erin Kryukova
(74) *Attorney, Agent, or Firm* — Muncy, Geissler, Olds & Lowe, P.C.

(57) ABSTRACT

An optical device includes a clamp seat and a light tuning assembly. The clamp seat includes a base, a curved portion extending from the base, and a pressing portion extending from the curved portion. The light tuning assembly includes a support frame disposed at the base, an optical lens restrained by the support frame, and an adjusting member coordinating with the optical lens. In an application of the optical device, a user may clamp a multimedia mobile communication device by the base and the pressing portion to allow the optical lens to align with a light projecting assembly of the multimedia mobile communication device. The adjusting member is rotated to adjust a distance between the optical lens and the light projecting assembly. Light from the light projecting assembly is then focused or dispersed through the optical lens to solve an issue of unadjustable light of a conventional solution.

6 Claims, 6 Drawing Sheets

(56) References Cited

U.S. PATENT DOCUMENTS

| | | | |
|---|---|---|---|
| 2013/0155666 A1* | 6/2013 | Yeh | F21L 4/027 362/187 |
| 2014/0071547 A1* | 3/2014 | O'Neill | G02B 7/02 359/827 |
| 2014/0226300 A1* | 8/2014 | O'Neill | G03B 15/06 362/18 |
| 2015/0042877 A1* | 2/2015 | O'Neill | H04N 5/2254 348/376 |
| 2015/0094124 A1* | 4/2015 | Kuo | H04M 1/0254 455/575.1 |
| 2015/0323160 A1* | 11/2015 | Duguid | G06F 1/1639 362/319 |
| 2017/0119250 A1* | 5/2017 | Kolachalama | A61B 3/1208 |

* cited by examiner

OPTICAL DEVICE FOR ADJUSTING LIGHT EMITTED FROM A MULTIMEDIA MOBILE COMMUNICATION DEVICE

FIELD OF THE INVENTION

The present invention relates to an optical device, and particularly to an optical device optionally installed to a multimedia mobile communication device and capable of adjusting light emitted from a light projecting assembly of the multimedia mobile communication device.

BACKGROUND OF THE INVENTION

With current highly developed technologies, various electronic devices are extensively used in people's daily lives. Among these electronic devices, multimedia mobile communication devices such as smart phones or tablet computers are most popular. As manufacturers continue to research and develop related technologies, multimedia mobile communication devices have progressed from initial functions of making/receiving phone calls and sending/receiving text messages to additional functions of multimedia players, digital cameras, flash lights, GPS navigation, gyroscopes and wireless Internet connection. More importantly, a user may install diverse mobile applications (Apps), such as games, counters/timers, compasses and notebooks, in these multimedia mobile communication devices. Thus, application functions of mobile communication devices can be expanded to meet user operation requirements.

Further, current multimedia mobile communication devices are mostly provided with a photographing lens and a light projecting assembly to allow a user to perform image or video capturing through the photographing lens, and to further reinforce contrast through the light projecting assembly when necessary. Further, the user may install a mobile application program collaborating with the light projecting assembly in a multimedia mobile communication device, and expand the functions of the light projecting assembly through the mobile application. For example, the expanded functions may include continual lighting, a flickering state, and intense or dim light, so as to allow the user to utilize the light projecting assembly as a flashlight, a visual prompt for incoming calls or a decorative light.

However, an illumination intensity and an illumination range of a light projecting assembly in a multimedia mobile communication device are fixed after the light projecting assembly has been manufactured. Further, instead of being capable of adjusting the light projecting assembly to focus or disperse light emitted from the light projecting assembly, the above mobile application can only change an input voltage of the light projecting assembly through program designs. By installing an associated mechanism in a multimedia mobile communication device to achieve the sole object of providing the multimedia mobile communication device with a function of adjusting the direction of the light, the complexity level circuit configuration in the multimedia mobile communication device and hence production costs of the multimedia mobile communication device are increased.

Therefore, it is apparent from the above description that, there is a need for an optical device capable of adjusting the direction of light of a light projecting assembly.

SUMMARY OF THE INVENTION

It is a primary object of the present invention to solve the issue of the incapability of adjusting the direction of light emitted from a light projecting element of a multimedia mobile communication device of the prior art.

To achieve the above object, the present invention provides an optical device that can be optionally installed to a multimedia mobile communication device and disposed corresponding to a light projecting assembly of the multimedia mobile communication device. The optical device includes a clamp seat and a light tuning assembly. More specifically, the clamp seat includes a base, a curved portion convolutionally extended from one end of the base, a pressing portion extended from one end of the curved portion away from the base towards close to the base, and a clamp space jointly defined by the base, the curved portion and the pressing portion and for accommodating the multimedia mobile communication device therein. The light tuning assembly includes a support frame, an optical lens and an adjusting member. The support frame is installed at the base, and includes a light passing region and a plurality of block walls disposed at an interval at the periphery of the light passing region. A passage is formed between any two of the block walls. The optical lens includes a lens portion disposed correspondingly to the light passing region, and at least one installation portion partially disposed at the periphery of the lens portion and restrained by one of the passages. The adjusting member is assembled with the block walls, and includes a driving portion facing the block walls and coordinating with the installation portion. Thus, the adjusting member may be rotated relative to the support frame and become displaceable in that passage through driving the installation portion by the driving portion.

In one embodiment, the base includes two guiding ribs disposed in parallel and connected to the curved portion, a stopping rib disposed at one end of the two guiding ribs away from the curved portion and connected to the two guiding ribs, and a hollow region formed among the two guiding ribs, the stopping rib and the curved portion. The support frame is assembled with the two guiding ribs and is capable of displacing in the hollow region. Further, the curved portion includes a stopping plate facing the stopping rib and slantingly extending towards into the hollow region.

In one embodiment, the base includes two tracks disposed in parallel and connected to the curved portion. The light tuning assembly includes two sliding blocks respectively disposed at two opposite sides of the support frame and respectively assembled with the tracks to become displaceable.

In one embodiment, the curved portion includes a first connecting section connected to the base, a second connecting section connected to the pressing portion, and a curled section connected between the first connecting section and the second connecting sections and being protuberant away from the clamp space. A through hole in communication with the clamp space is formed at an inner side of the curled section.

In one embodiment, the installation portion and the driving portion coordinate with each other to form a screw fastening structure. More specifically, the adjusting member includes a lens cover fixedly disposed at the installation portions, and an adjusting ring sleeved around the lens cover and located at the outer periphery of the block walls. The lens cover includes a light passing hole aligned with the lens portion, and the driving portion is disposed at an inner wall surface of the adjusting ring. Further, each of the block walls includes a fastening groove, and the lens cover includes a plurality of fastening pieces respectively fastened at the fastening grooves.

In one embodiment, the optical lens includes the installation portion in a plural number, and each of the installation portions is restrained by one of the passages.

Through the foregoing embodiments, the present invention provides following features compared to the prior art.

In the present invention, the support frame is installed at the base, and the adjusting member is provided with a driving portion that faces the block walls and coordinates with the installation portion. Thus, when the multimedia mobile communication device is clamped by the base and the pressing portion, the lens portion is allowed to align with a light projecting assembly of the multimedia mobile communication device. A user may rotate the adjusting member to adjust a distance between the lens portion and the light projecting assembly to focus or disperse light emitted from the light projecting assembly, thereby solving the issue of the incapability of adjusting the direction of light emitted from a multimedia mobile communication device of the prior art.

DETAILED DESCRIPTION OF THE PREFERRED EMBODIMENTS

Details and technical contents of the present invention are given with the accompanying drawings below.

Figure 1:
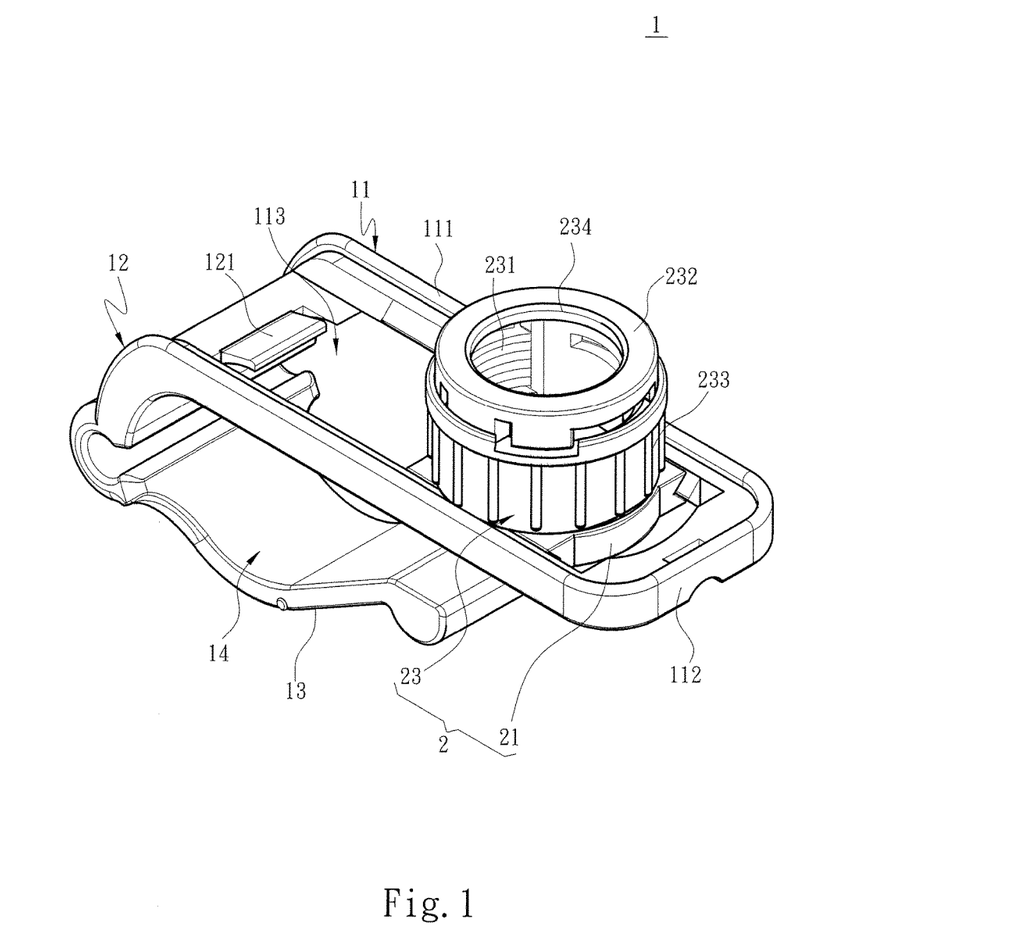
FIG. 1 is a perspective view according to a first embodiment of the present invention.
Figure 2:
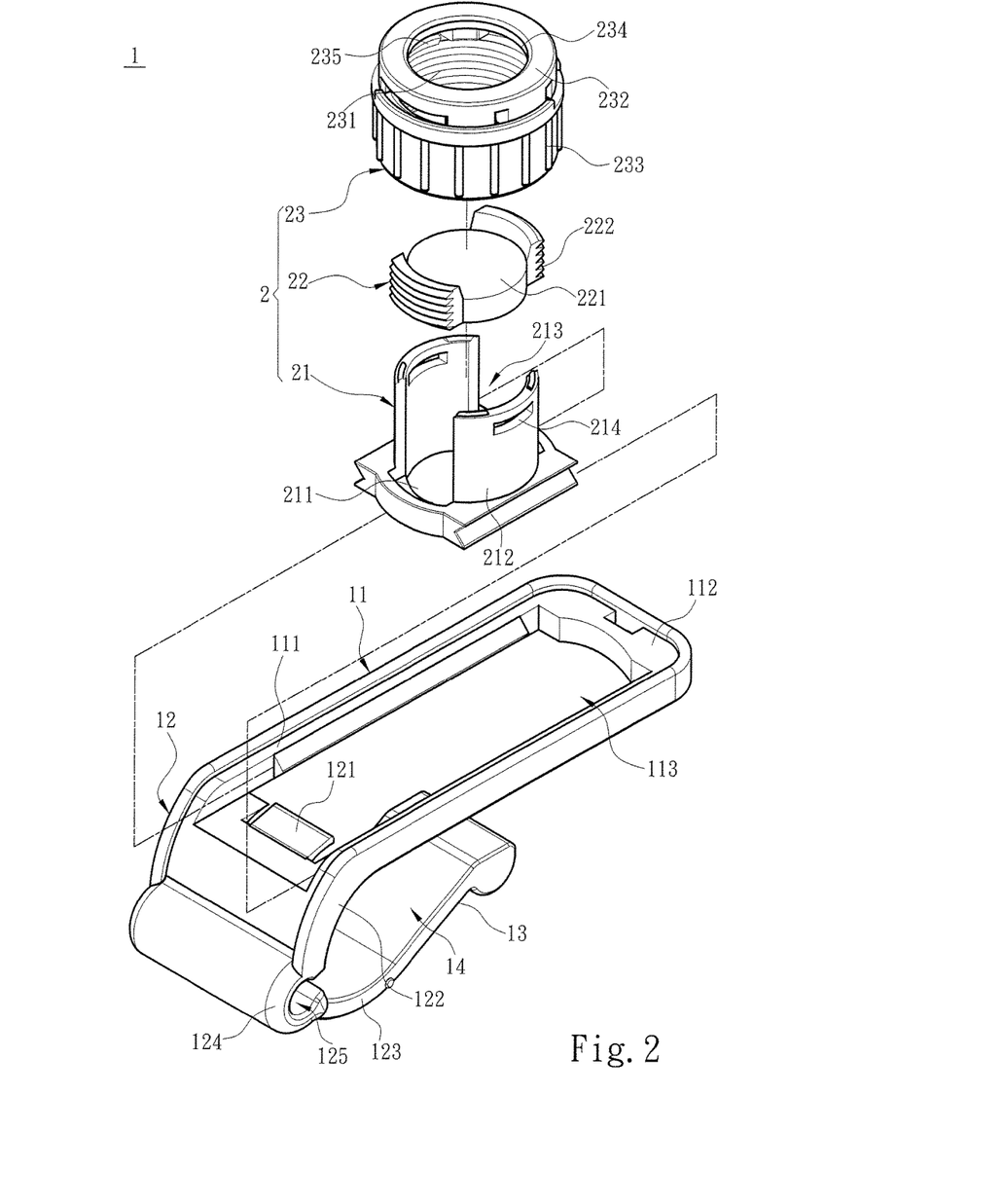
FIG. 2 is an exploded view according to the first embodiment of the present invention.

Referring to FIG. 1 and FIG. 2, an optical device provided by the present invention includes a clamp seat 1 and a light tuning assembly 2. The clamp seat 1 includes a base 11, a curved portion 12 convolutionally extended from one end of the base 11, and a pressing portion 13 extended from one end of the curved portion 12 away from the base 11 towards close to the base 11. Further, a clamp space 14 is jointly defined by the base 11, the curved portion 12 and the pressing portion 13.

The light tuning assembly 2 includes a support frame 21, an optical lens 22 and an adjusting member 23. As shown in FIG. 1 and FIG. 2, the optical lens 22 is installed at the support frame 21, and the adjusting member 23 is assembled at the support frame 21 and coordinates with the optical lens 22. More specifically, the support frame 21 includes a light passing region 211, and a plurality of block walls 212 disposed at an interval at the periphery of the light passing region 211. A passage 213 is formed between any two of the block walls 212. Further, the optical lens 22 includes a lens portion 221, and at least one installation portion 222 partially disposed at the periphery of the lens portion 221. The lens portion 221 is disposed correspondingly in the light passing region 211, and is restrained by one of the passages 213. For example, the lens portion 221 may be a convex lens, a concave lens or other types of lenses. In one embodiment, when the lens portion 221 is provided in a plural number, these lens portions 221 are respectively restrained by the passages 213. That is, the number of the lens portions 221 corresponds to the number of the passages 213. Further, the adjusting member 23 is assembled at the block walls 212, and includes a driving portion 231 that faces the block walls 212 and coordinates with the installation portion 222. As such, the adjusting member 23 is rotatable relative to the support frame 21, and becomes capable of displacing in the passage 213 through driving the installation portion 222 by the driving portion 231.

Figure 3:
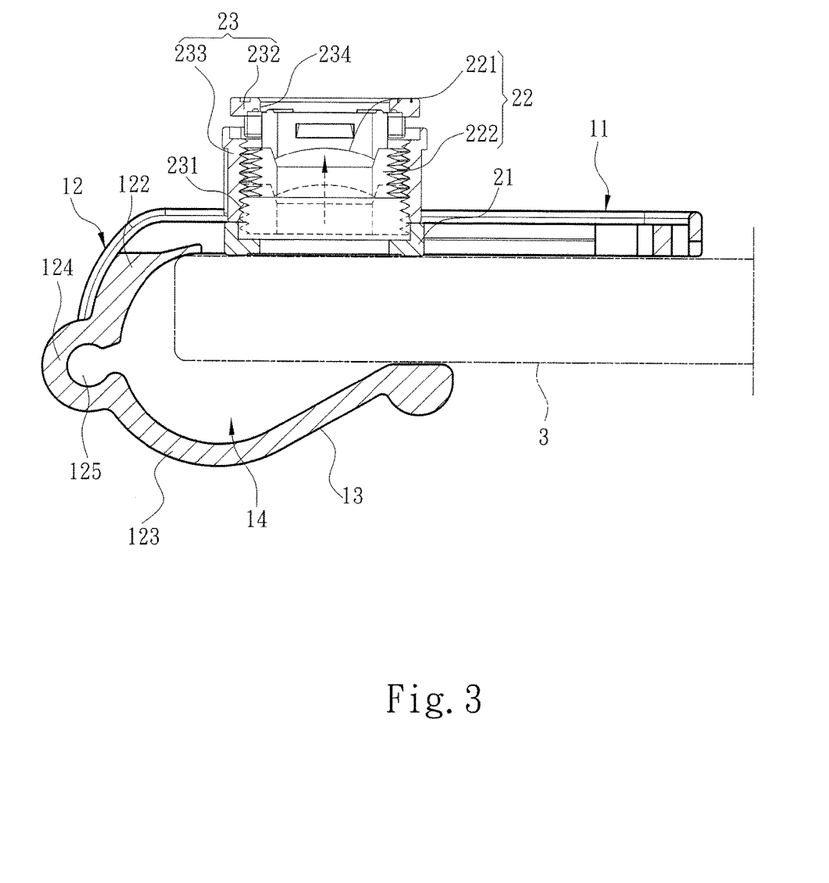
FIG. 3 is a side view according to the first embodiment of the present invention.
Figure 4:
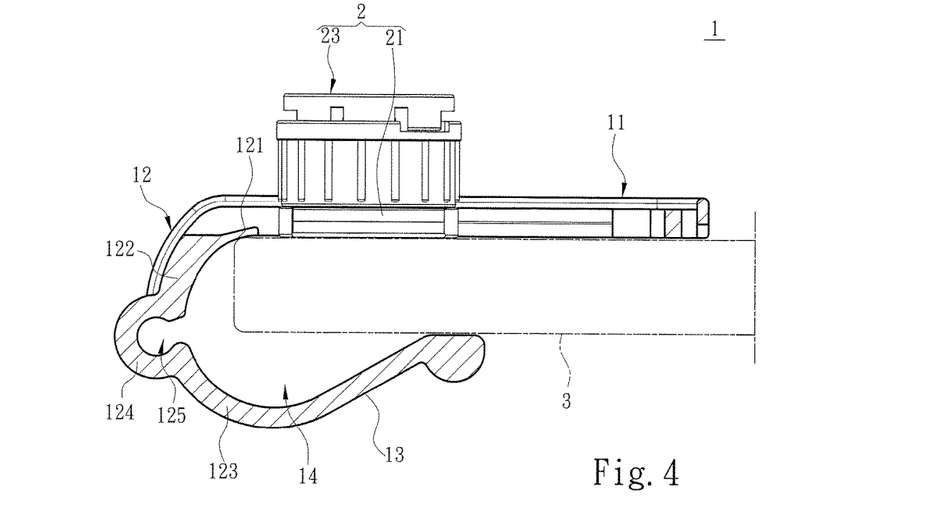
FIG. 4 is a first side view according to a second embodiment of the present invention.

More specifically, the adjusting member 23 includes a lens cover 232 and an adjusting ring 233. As shown in FIG. 2 and FIG. 3, the lens cover 232 includes a light passing hole 234 aligned with the lens portion 221, and is fixed at the top of the block walls 212. The adjusting ring 233 is sleeved around the lens cover 232 and located at the outer periphery of the block walls 212, and is caused to be rotatable between the support frame 21 and the lens cover 232. More specifically, each of the block walls 212 includes a fastening groove 214, and the lens cover 232 includes a plurality of fastening pieces 235 respectively fastened with the fastening grooves 214. It should be noted that, the driving portion 231 is disposed at an inner wall surface of the adjusting ring 233, and the installation portion 222 and the driving portion 231 coordinate with each other to form a screw fastening structure. The installation portion 222 is an outer thread, the driving portion 231 is an inner thread, and the installation portion 222 and the driving portion 231 may form the screw fastening structure by mutually screwing the outer thread and the inner thread. As such, the adjusting ring 233 may move the outer thread with the inner thread when rotated to cause the optical lens 22 to displace within the block walls 212.

Structural details of the clamp seat 1 and the light tuning assembly 2 are illustrated in the above description. Referring to FIG. 1 to FIG. 3, during an application process of the optical device, the support frame 21 is fixedly installed at the base 11. A user may place a multimedia mobile communication device 3 into the clamp space 14, such that the base 11 and the pressing portion 13 clamp opposite sides of the multimedia mobile communication device 3 (as shown in FIG. 3), and the lens portion 221 is aligned with a light projecting assembly (not shown) of the multimedia mobile communication device 3. At this point, the user may rotate the adjusting member 23 rotate the adjusting member 23, drive the installation portion 222 by the driving portion 231 to cause the installation portion 222 to displace in one of the passages 213 to further adjust a distance between the lens portion 221 and the light projecting assembly, and change the direction of light emitted from the light projecting assembly to focus or disperse the light. Thus, utilization requirements of the light projecting assembly can be satisfied to solve the issue of the incapability of adjusting the direction of light emitted of a conventional multimedia mobile communication device 3.

Figure 5:
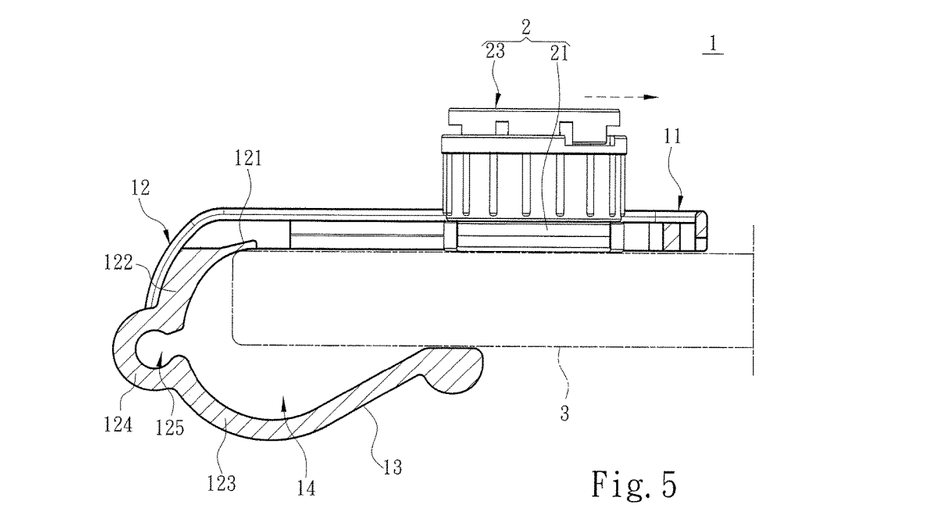
FIG. 5 is a second side view according to the second embodiment of the present invention.
Figure 6:
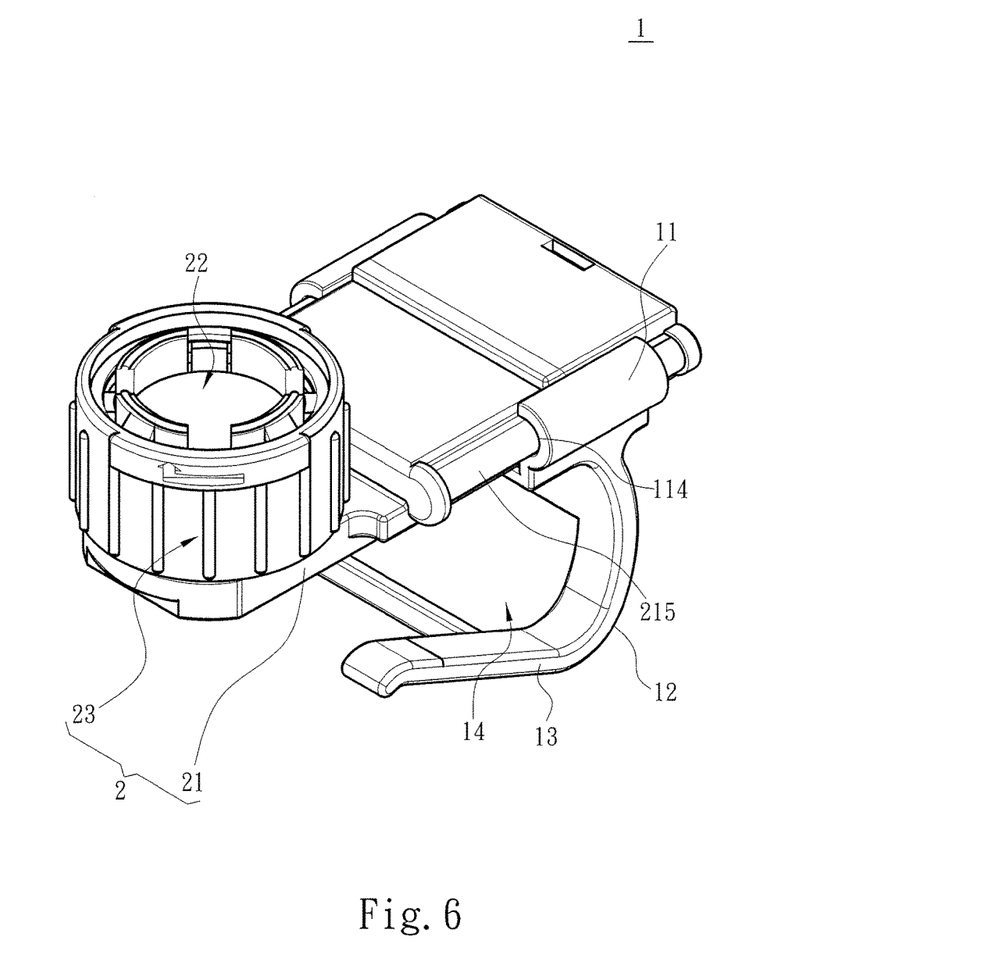
FIG. 6 is a perspective view according to a third embodiment of the present invention.

Further, due to the size of the multimedia mobile communication device 3, the multimedia mobile communication device 3 may not entirely correspond to the optical device, or the position of the light projecting assembly may not be exactly aligned with the lens portion 221. Thus, in one embodiment, as shown in FIG. 1, FIG. 2, FIG. 4 and FIG. 5, the base 11 includes two guiding ribs 111 disposed in parallel and connected to the curved portion 12, a stopping rib 112 connected to the two guiding ribs 111, and a hollow region 113 formed among the two guiding ribs 111, the stopping rib 112 and the curved portion 12. The support frame 21 is assembled between the two guiding ribs 111 and is located in the hollow region 113, and is further capable of displacing at the two guiding ribs 111 to allow the lens portion 221 align with the light projecting assembly. More specifically, the curved portion 12 may further include a stopping plate 121, which faces the stopping rib 112 and extends slantingly towards inside the hollow region 113, as shown in FIG. 1 and FIG. 5. Thus, the clamp seat 1 may restrain the support frame 21 within the hollow region 113 through the stopping rib 112 and the stopping plate 121. In another embodiment, as shown in FIG. 6, the base 11 may include two tracks 114 disposed in parallel and connected to the curved portion 12, and the support frame 21 may include two sliding blocks 215 disposed at two opposite sides and respectively assembled with the tracks 114. As such, the support frame 21 may displace at the tracks 114 through the two respective sliding blocks 215 to allow the optical lens 22 to align with the light projecting assembly.

Figure 7:
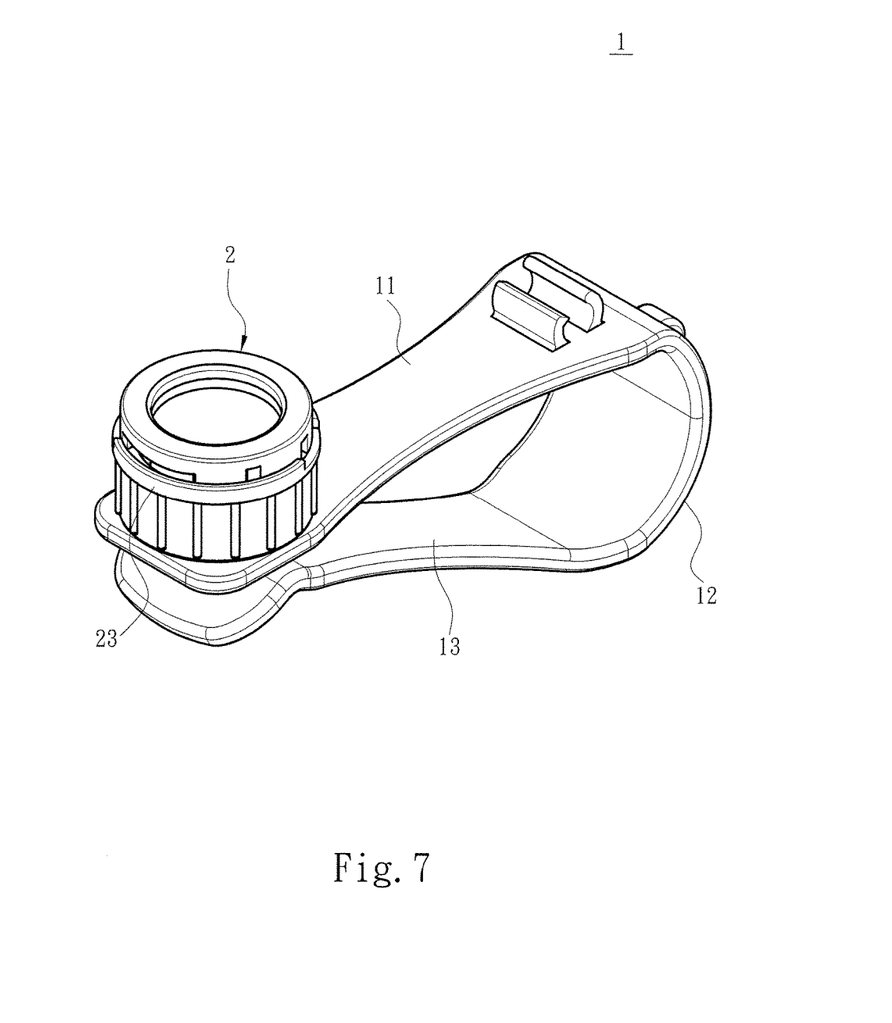
FIG. 7 is a perspective view according to a fourth embodiment of the present invention.

Further, the support frame 21 may be in an application form of having a fixed position after being installed at the two guiding ribs 111. Further, in one embodiment, as shown in FIG. 7, the base 11 may further be in an application form of a solid plate, such that the optical device may reinforce the overall structural strength through the base 11.

On the other hand, a user may additionally install an earphone apparatus (not shown) for listening to music or making/receiving phone calls when applying the multimedia mobile communication device 3. Thus, in one embodiment, as shown in FIG. 1 to FIG. 3, the curved portion 12 includes a first connecting section 122 connected to the base 11, a second connecting section 123 connected to the pressing portion 13, and a curled section 124 connected between the first connecting section 122 and the second connecting section 123 and being protuberant away from the clamp space 14. A through hole 125 in communication with the clamp space 14 is formed at an inner side of the curled section 124. For example, the through hole 125 is in a round tubular form. To put the embodiment to application, a user may insert a cylindrical plug or a transmission line of the earphone apparatus into the through hole 125 for storage. Further, it should be noted that, to prevent the curved portion 12 from breaking as of a result of being pressed against the base 11 and the pressing portion 13 by an excessive volume of the multimedia mobile communication device 3, the curved portion 12 may be provided with an enlarged overall bending range through the curled section 124.

What is claimed is:

1. An optical device, for installation to a multimedia mobile communication device, corresponding to a light projecting assembly of the multimedia mobile communication device, the optical device comprising:

a clamp seat, comprising a base, a curved portion convolutionally extended from one end of the base, a pressing portion extended from one end of the curved portion away from the base towards close to the base, and a clamp space jointly defined by the base, the curved portion and the pressing portion and for accommodating the multimedia mobile communication device therein, wherein the base comprises two guiding ribs disposed in parallel and connected to the curved portion, a stopping rib disposed at the ends of the two guiding ribs away from the curved portion and connected to the two guiding ribs and a hollow region formed among the two guiding ribs, the stopping rib and the curved portion; and a light tuning assembly, comprising a support frame, an optical lens and an adjusting member, the support frame comprising a light passing region and a plurality of block walls disposed at an interval at the periphery of the light passing region, a plurality of passages being formed between the plurality of block walls, the optical lens comprising a lens portion disposed correspondingly to the light passing region and at least one installation portion partially disposed at the periphery of the lens portion and restrained by one of the passages, the adjusting member being assembled with the block walls and comprising a driving portion that faces the block walls and coordinates with the installation portion, the adjusting member being capable of rotating relative to the support frame to displace in the passage through driving the installation portion by the driving portion;

wherein the support frame is assembled with the two guiding ribs and capable of displacing in the hollow region, the curved portion comprises a stopping plate that faces the stopping rib and extends slantingly towards inside the hollow region, the curved portion comprises a first connecting section connected to the base, a second connecting section connected to the pressing portion, and a curled section connected between the first connecting section and the second connecting section, and the curved portion is protuberant away from the clamp space.

2. The optical device of claim 1, wherein a through hole in communication with the clamp space is formed at an inner side of the curled section.

3. The optical device of claim 1, wherein the installation portion and the driving portion coordinate with each other to form a screw fastening structure.

4. The optical device of claim 3, wherein the adjusting member comprises a lens cover fixedly disposed at the installation portion, and an adjusting ring sleeved around the lens cover and located at the outer periphery of the block walls, the lens cover comprises a light passing hole aligned with the lens portion, and the driving portion is disposed at an inner wall surface of the adjusting ring.

5. The optical device of claim 4, wherein each of the block walls comprises a fastening groove, and the lens cover comprises a plurality of fastening pieces respectively fastened with the fastening grooves.

6. The optical device of claim 1, wherein the optical lens comprises the installation portion in a plural number, and each of the installation portions is restrained in one of the passages.

* * * * *